United States Patent
Ide

(10) Patent No.: US 11,801,748 B2
(45) Date of Patent: Oct. 31, 2023

(54) AUTOMATED DRIVING CONTROL SYSTEM

(71) Applicant: TOYOTA JIDOSHA KABUSHIKI KAISHA, Toyota (JP)

(72) Inventor: Hirohito Ide, Nagoya (JP)

(73) Assignee: TOYOTA JIDOSHA KABUSHIKI KAISHA, Toyota Aichi-ken (JP)

(*) Notice: Subject to any disclaimer, the term of this patent is extended or adjusted under 35 U.S.C. 154(b) by 78 days.

(21) Appl. No.: 17/524,284

(22) Filed: Nov. 11, 2021

(65) Prior Publication Data

US 2022/0194226 A1 Jun. 23, 2022

(30) Foreign Application Priority Data

Dec. 18, 2020 (JP) .................................. 2020-209768

(51) Int. Cl.
*B60K 31/00* (2006.01)

(52) U.S. Cl.
CPC ...... *B60K 31/00* (2013.01); *B60K 2031/0091* (2013.01)

(58) Field of Classification Search
CPC .................. B60K 31/00; B60K 2031/0091
See application file for complete search history.

(56) References Cited

U.S. PATENT DOCUMENTS

| | | | | |
|---|---|---|---|---|
| 2018/0345963 | A1* | 12/2018 | Maura | G05D 1/0088 |
| 2019/0041652 | A1* | 2/2019 | Murayama | G02B 27/0179 |
| 2019/0382018 | A1* | 12/2019 | Garnault | B60W 30/18163 |
| 2021/0103279 | A1 | 4/2021 | Ide et al. | |

FOREIGN PATENT DOCUMENTS

| | | |
|---|---|---|
| JP | 2018-124855 A | 8/2018 |
| JP | 2021-059170 A | 4/2021 |

* cited by examiner

*Primary Examiner* — Truc M Do
(74) *Attorney, Agent, or Firm* — Dinsmore & Shohl LLP

(57) ABSTRACT

A speed control device can execute continuous deceleration control and speed setting change control. In the continuous deceleration control, a vehicle is decelerated over a period of time that a first operation is effective. In the speed setting change control, upon reception of a second operation, one set speed is selected out of a plurality of set speeds that are set in advance, and a target speed of the vehicle is changed to the selected set speed. When a deceleration completion speed, which is a speed at completion of the continuous deceleration control, is equal to or above a slowest set speed among the set speeds, the speed control device is configured to set as a new target speed the set speed that is equal to or below the deceleration completion speed and that is closest to the deceleration completion speed.

3 Claims, 15 Drawing Sheets

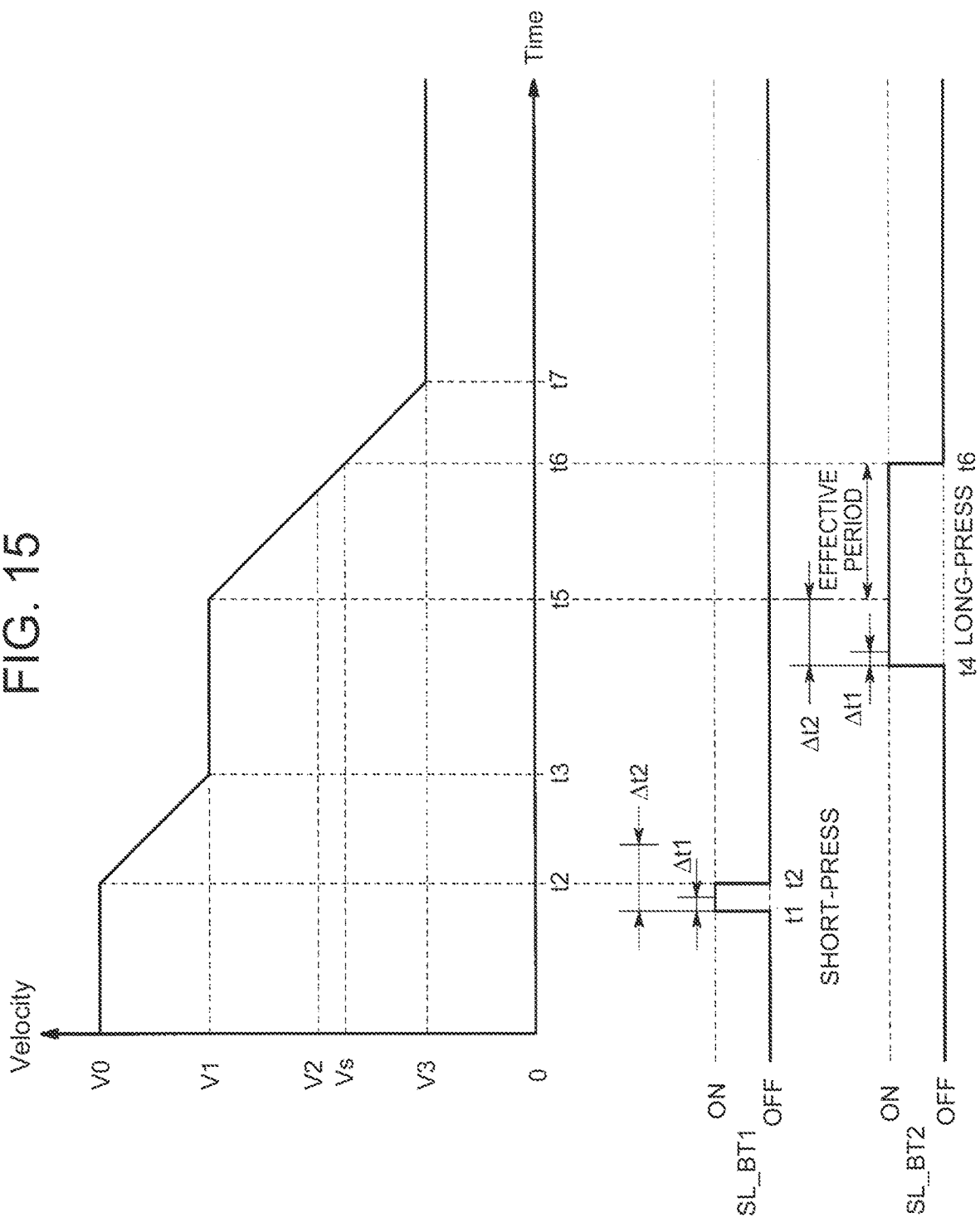

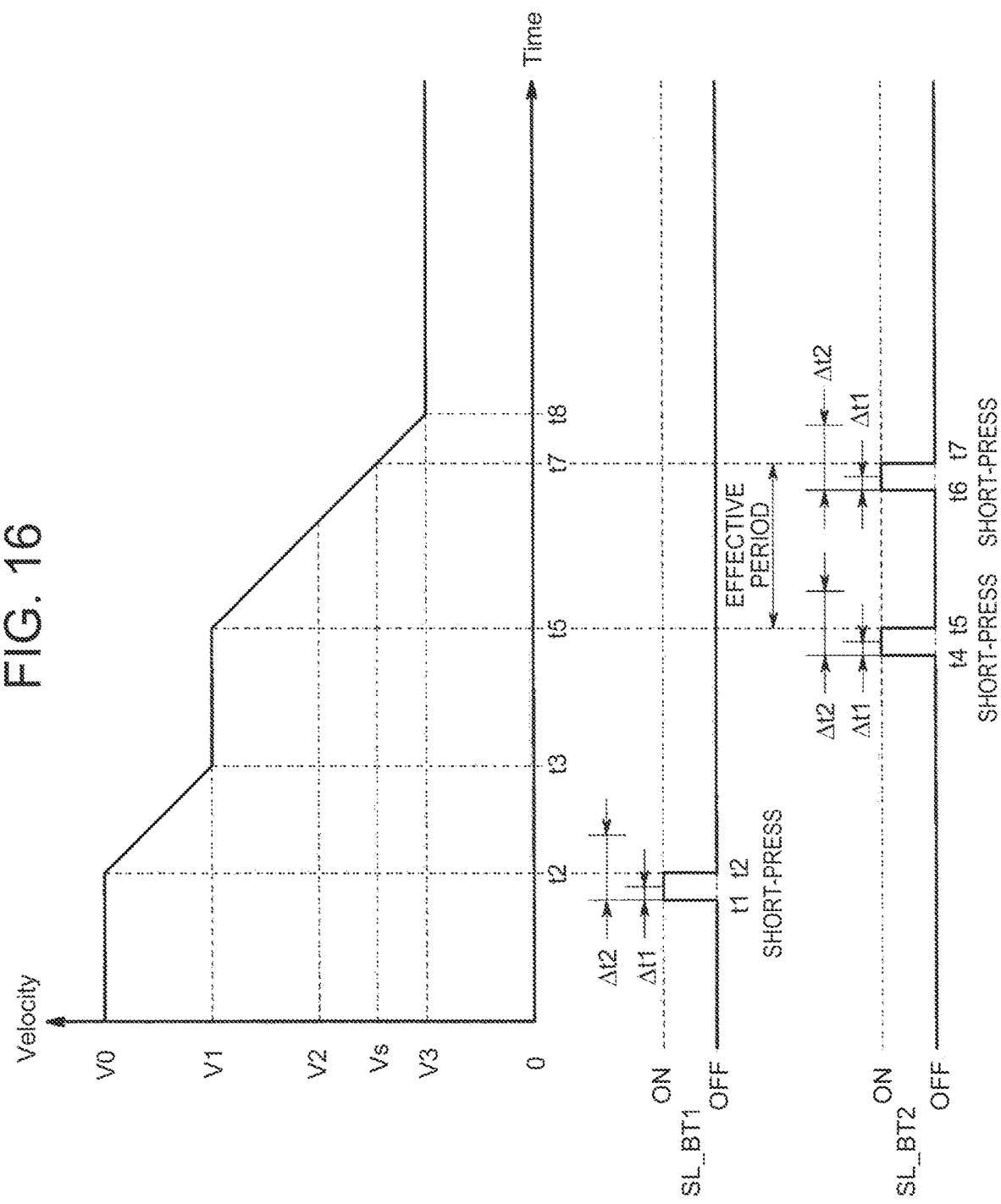

AUTOMATED DRIVING CONTROL SYSTEM

CROSS-REFERENCE TO RELATED APPLICATION

This application claims priority to Japanese Patent Application No. 2020-209768 filed on Dec. 18, 2020, incorporated herein by reference in its entirety.

BACKGROUND

1. Technical Field

The present disclosure relates to an automated driving control system adopted for automated vehicles.

2. Description of Related Art

Automated vehicles capable of performing automated driving are known. The term "automated driving" means that a computer executes all or part of driving controls, including vehicle speed control and steering control. For example, automated vehicles have a plurality of driving modes, including an automated driving mode for automated driving, and a manual driving mode involving driving control performed by an operator riding on the automated vehicle. Some automated vehicles accept operation inputs from the operator in the automated driving mode, and perform control in response to the operation inputs.

For example, Japanese Unexamined Patent Application Publication No. 2018-124855 discloses an automated vehicle provided with two emergency control switches located in the vicinity of a driver (equivalent to the operator). The switch located relatively far from the driver is used for emergency control all the time, while the switch located relatively close to the driver is displayed on the touch panel upon detection of poor health of the driver.

SUMMARY

It is considered that the automated vehicles can become more convenient and cope with various traffic conditions if the automated vehicles are configured to be able to change vehicle speed in accordance with an operator's intention during traveling in the automated driving mode. For example, when the operator inside the vehicle can execute driving control for setting one of a plurality of set speeds and causing the vehicle to travel at the selected set speed as a target speed, or driving control for decelerating and slowing down the vehicle at the time of passing through roads with poor visibility, as in the case of cruise control or the like, it leads to enhanced convenience.

Here, assume the case where the vehicle is decelerated while traveling at a predetermined set speed. In this case, when the deceleration is complete, the vehicle may accelerate in an attempt to return to the predetermined set speed against the intention of the operator. This specification discloses an automated driving control system for a vehicle that enables an operator to perform speed control during automated driving, the system being configured to be able to restrain acceleration of the vehicle that is against the intension of an operator.

An automated driving control system disclosed in this specification includes an operation input device and a speed control device. The operation input device is configured to accept a first operation and a second operation performed by an operator while a vehicle is traveling in an automated driving mode. The speed control device is configured to control speed of the vehicle in accordance with the first operation and the second operation. The speed control device executes continuous deceleration control and speed setting change control. In the continuous deceleration control, the vehicle is decelerated over a period of time that the first operation is effective. In the speed setting change control, upon reception of the second operation, one set speed is selected out of a plurality of set speeds that are set in advance, and a target speed of the vehicle is changed to the selected set speed. When, upon completion of the continuous deceleration control, a deceleration completion speed, which is a speed at completion of the continuous deceleration control, is equal to or above a slowest set speed among the set speeds, the speed control device is configured to set as a new target speed the set speed that is equal to or below the deceleration completion speed and that is closest to the deceleration completion speed.

According to the configuration, after completion of the continuous deceleration control, the set speed that is equal to or below the deceleration completion speed and that is closest to the deceleration completion speed is set as a new target speed. Such a control aspect can restrain acceleration against the intension of the operator after the continuous deceleration control is completed. Moreover, since the target speed after completion of the continuous deceleration control is selected from the settable set speeds with the speed setting change control, the vehicle is restrained from traveling at speeds other than the set speeds that are set in advance. As a result, consistency between the continuous deceleration control and the speed setting change control is achieved.

With the configuration, when the deceleration completion speed is less than the slowest set speed, the speed control device may be configured to set the slowest set speed as the new target speed.

According to the configuration, since the target speed is set to the slowest set speed closest to the deceleration completion speed, it is possible to restrain the acceleration against the intension of the operator as compared with the case where other set speeds are set as the target speed. Moreover, since the target speed after completion of the continuous deceleration control is selected from the settable set speeds with the speed setting change control, the vehicle is restrained from traveling at speeds other than the set speeds that are set in advance. As a result, consistency between the continuous deceleration control and the speed setting change control is achieved.

With the configuration, the operation input device may be a button. In this case, the first operation may be a long-press operation for continuously pressing the button for more than a prescribed threshold period. The speed control device may complete the deceleration of the vehicle immediately after releasing the pressing of the button in the first operation.

According to the configuration, since the vehicle continues to decelerate during the long-press operation, it becomes possible to analogize conventional vehicle braking controls which continuously decelerate the vehicle during a period of time that the brake pedal is pressed. This makes it possible to enhance operability.

With the configuration, the second operation may be a short-press operation for continuously pressing the button for a threshold period or less. In this case, the speed control device may be configured to change the target speed when the short-press operation on the button is detected.

According to the configuration, the first operation and the second operation can be distinguished by the pressing period of the button, so that different speed controls can be performed with a single button.

The automated driving control system in this specification can restrain accelerating against the intension of the operator in a vehicle that enables an operator to perform speed control during automated driving from.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 15 is an illustration of the speed setting change control and the continuous deceleration control using the touch panel shown in FIG. 14; and FIG. 16 shows another example of the speed setting change control and the continuous deceleration control using the touch panel shown in FIG. 14.

DETAILED DESCRIPTION OF EMBODIMENTS

Hereinafter, a driving control system according to an embodiment will be described with reference to the drawings. In the description, specific aspects are presented for easy understanding. However, they merely illustrate the embodiment, and various other embodiments are possible.

Automated Driving Control System

Figure 1:
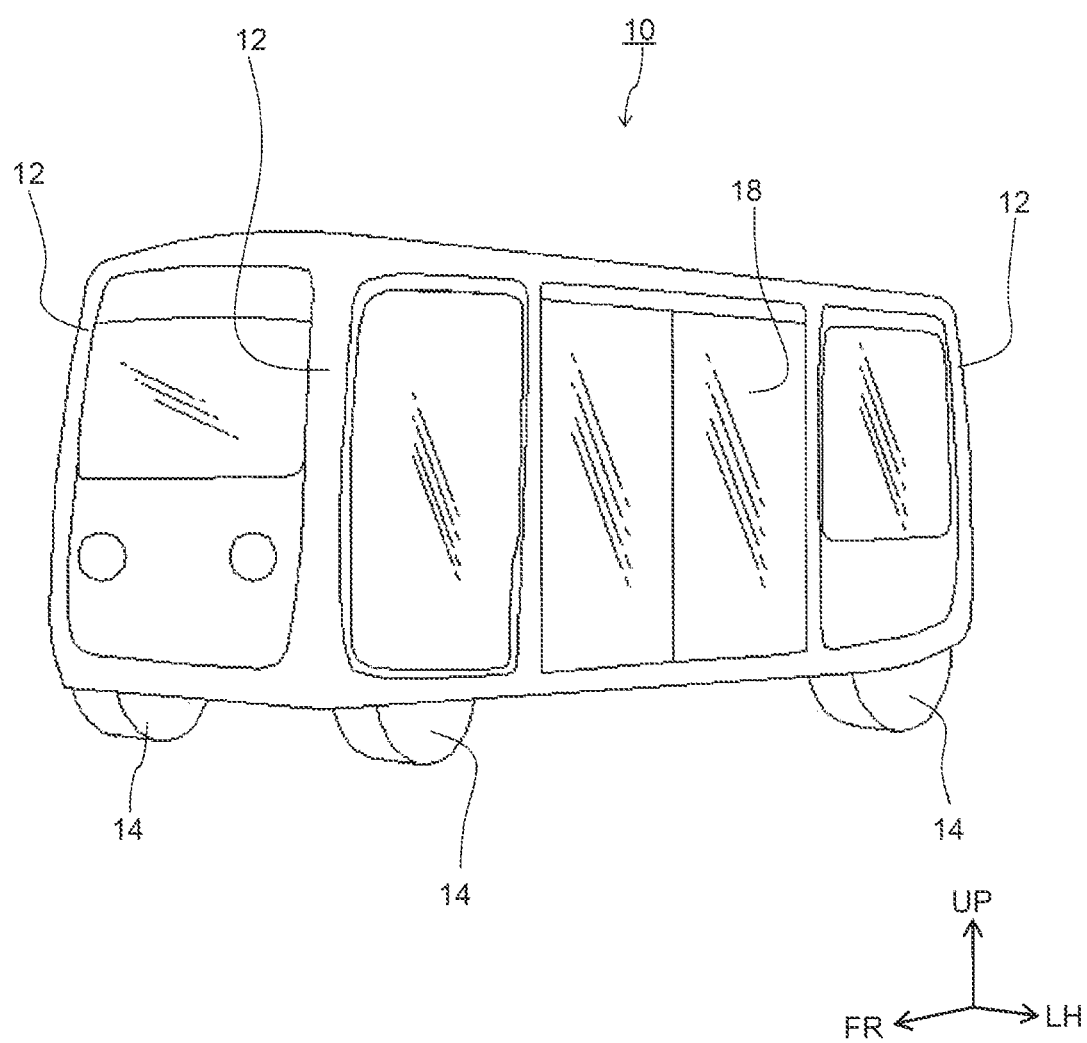
FIG. 1 is an appearance view of an automated vehicle according to an embodiment.
Figure 4:
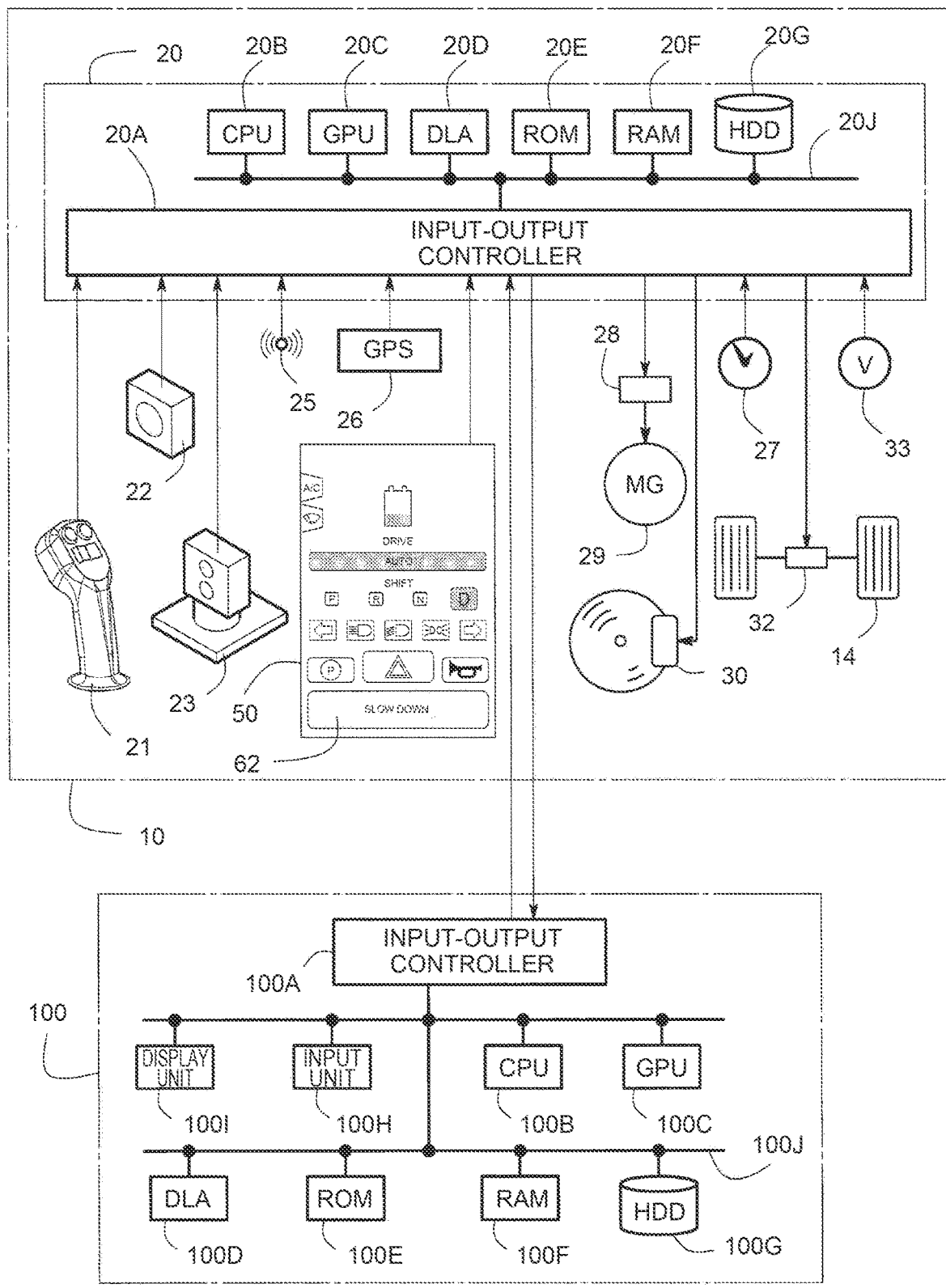
FIG. 4 illustrates a hardware configuration of the automated driving control system according to the embodiment.

FIG. 1 illustrates an exterior of an automated vehicle 10 according to the present embodiment. FIG. 4 illustrates a hardware configuration of the automated driving control system according to the embodiment, including the automated vehicle 10 and a management server 100. In FIG. 1 and other drawings of this specification, the terms "front (FR)" and "rear" refer to front and rear sides in a vehicle front-rear direction. The terms "left (LH)" and "right" refer to left and right sides (in vehicle width direction) when the vehicle faces forward. The terms "upward (UP)" and "downward" refer to upper and lower sides in an up-and-down direction of a vehicle (vehicle height direction).

Referring to FIG. 1, for example, the automated vehicle 10 is a shared vehicle shared by a large number of unspecified occupants. In the present embodiment, the automated vehicle 10 is used as a shared bus to transport passengers while traveling along a designated route inside a specific site. Therefore, it is assumed that the automated vehicle 10 repeatedly stops and starts with a relatively high frequency. The automated vehicle 10 is also assumed to travel at relatively low speeds (e.g. 30 km/h or less).

However, the use form of the automated vehicle 10 disclosed in this specification is variable as appropriate. For example, the automated vehicle 10 can be used as a movable business space, and can also be used as a retail store to display and sell a variety of products, or as a restaurant to cook and serve food and drink. In another use form, the automated vehicle 10 may be used as an office for administrative work and for meetings with clients. The automated vehicle 10 may also be used in other than business scenes. For example, the automated vehicle 10 may be used as a mode of individual transportation.

The automated vehicle 10 is an electric vehicle having as a motor a rotary electric machine 29 (see FIG. 4) that receives electric power supply from a battery. The battery is a rechargeable secondary battery that is periodically charged with external electric power. Without being limited to the electric vehicle, the automated vehicle 10 may be a vehicle of other types. For example, the automated vehicle 10 may be an engine vehicle mounted with an engine (internal combustion engine) as a motor, or a hybrid vehicle mounted with the engine and the rotary electric machine 29 as a motor. The automated vehicle 10 may further be a hydrogen vehicle that drives the rotary electric machine 29 using electric power generated by fuel cells.

The automated vehicle 10 is a vehicle capable of performing automated driving. Specifically, the automated vehicle 10 can drive in a plurality of driving modes, including an automated driving mode and a manual driving mode.

The automated driving mode is a driving mode in which the computer mainly performs driving control. In this specification, the driving control is a concept including shift change control, speed control, and steering control. The speed control is also the concept including acceleration and deceleration control, target speed setting control, and target speed change control of the automated vehicle 10.

In the present embodiment, the automated driving mode includes a control mode by the management server 100 (see FIG. 4) and a control mode by the automated vehicle 10. The control mode by the management server 100 is a control aspect in which the computer mounted on the automated vehicle 10 performs driving control under driving instructions from the management server 100.

The management server 100 is provided to manage and control two or more automated vehicles 10 and configured to be communicable with each of the automated vehicles 10. In the control mode by the management server 100, driving routes and traveling speeds of each of the automated vehicles 10 are set by the instructions of the management server 100 such that the automated vehicle 10 travels in accordance with predetermined routes or operation schedules, for example.

In the automated driving control (remote automated driving control) by the management server 100, the driving control by the computer mounted on the automated vehicle 10 is mostly performed under the instructions of the management server 100. A hardware configuration and functional blocks of the management server 100 will be described later in described.

Among the automated driving modes, the control mode by the automated vehicle 10 is basically the mode in which most of the driving controls of the automated vehicle 10 are performed solely based on the determination of the computer mounted on the automated vehicle 10 without receiving any external instructions. From this point of view, while the automated driving control (remote automated driving control) by the management server 100 is so-called heteronomous automated driving control based on instructions from the outside of the automated vehicle 10, the control mode by the automated vehicle 10 is an autonomous driving control aspect.

In the control mode by the automated vehicle 10, the computer of the automated vehicle 10 performs driving control based on detection results of various sensors (described later) provided in the automated vehicle 10 without receiving instructions from the management server 100, and travels along predetermined routes. As will be described later, a control unit 20 illustrated in FIG. 4 is equivalent to the computer that performs driving control.

Here, in order to reflect, for example, on-site determination made by an operator riding on the automated vehicle 10, vehicle control by the operator is allowed both in the automated driving mode by the management server 100 and in the automated driving mode by the automated vehicle 10.

The operator is a person who rides on the automated vehicle 10 and is involved in the control of the automated vehicle 10. For example, a person who is an employee of a company that provides transportation services using the automated vehicles 10 and who is a driver with knowledge and skills relating to control of the automated vehicle 10 rides on the automated vehicle 10 as the operator. The vehicle control, which enables the operator to perform so-called interrupt control, includes speed setting change control and continuous deceleration control as will be described later.

In the automated driving control system according to the present embodiment, information processing is performed such that speed control commands based on operation of the operator takes precedence over the driving control commands output by the management server 100 or by the automated vehicle 10 itself. For example, in the event of a conflict between a driving control command (for example, an acceleration instruction) by the management server 100 or the automated vehicle 10 itself and a speed control command by the operator (for example, a deceleration command), the former command is invalid, and control is executed based on the latter command.

The manual driving mode is a mode in which the operator riding on the automated vehicle 10 performs driving control of the automated vehicle 10 instead of the automated vehicle 10 performing automated driving. In the manual driving mode, the operator acts as a driver who directly performs driving operation of the automated vehicle 10. For example, in addition to speed control, the operator also performs steering control.

Exterior and Interior of Automated Vehicle

Referring to FIG. 1, the automated vehicle 10 has a rectangular parallelepiped shape symmetrically formed in a front-rear direction, with its exterior design being also symmetrical in the front-rear direction. At four corners of a planar view, pillars 12 are provided to extend in a vertical direction. Below the pillars 12, wheels 14 are provided.

On the left side of the automated vehicle 10, a door 18 is provided. For example, the door 18 is a sliding door, and occupants can ride on and off when the door 18 slides to open.

Figure 2:
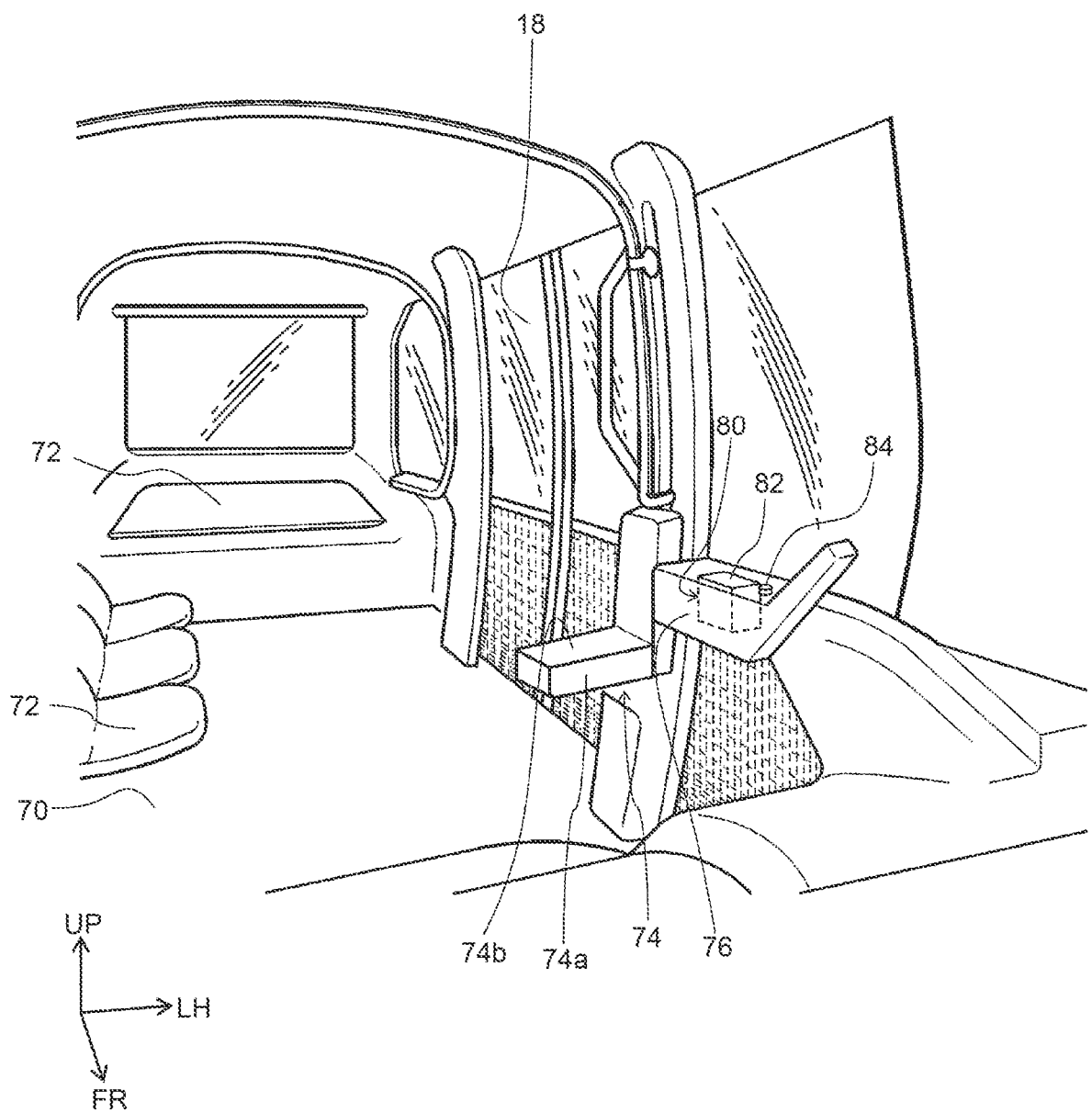
FIG. 2 is a first perspective view showing the inside of a vehicle cabin of the automated vehicle according to the embodiment.
Figure 3:
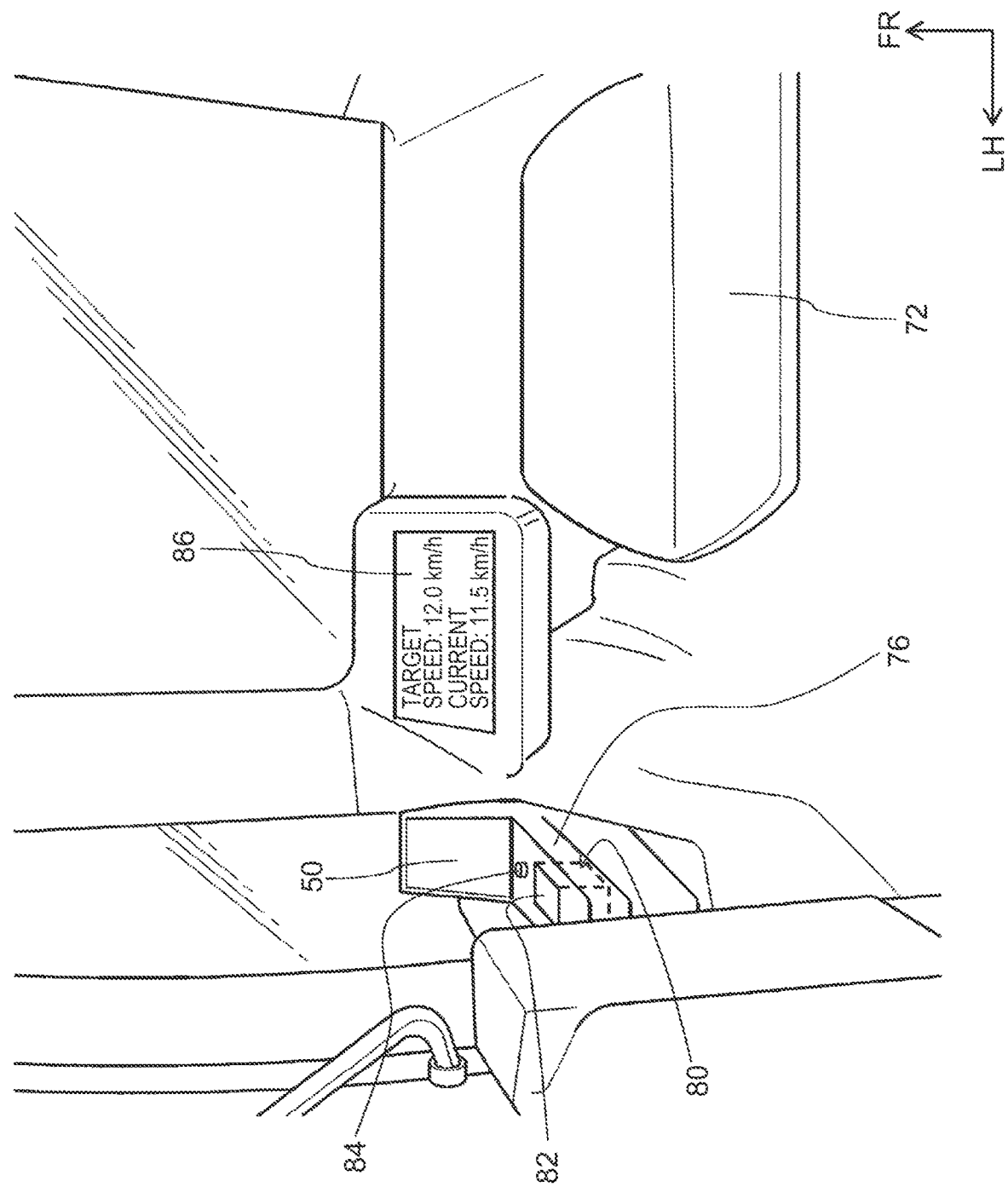
FIG. 3 is a second perspective view showing the inside of the vehicle cabin of the automated vehicle according to the embodiment.

FIGS. 2 and 3 illustrate the inside of the vehicle cabin of the automated vehicle 10. As described above, the automated vehicle 10 is used as a bus. Accordingly, a center part of the vehicle cabin serves as a floor 70 used for standing passengers or for placing wheelchairs used by passengers. Along the side walls of the vehicle cabin, passenger seats 72 are provided.

The automated vehicle 10 has an operator seat 74 provided for an operator to perform driving control of the automated vehicle 10 and to perform operation of various devices (air conditioner, wipers, etc.) provided in the automated vehicle 10.

For example, the operator seat 74 can be jumped up, so that the operator seat 74 can be stored on a wall side of the vehicle cabin when the operator is not present and automated driving is performed. In FIG. 2, a seat part 74a of the operator seat 74 is lowered and a seat surface 74b is exposed.

In front of the operator seat 74, an armrest 76 extending in the front-rear direction is provided for the operator seated on the operator seat 74 to put his or her arm. Provided at a front end of the armrest 76 is a touch panel 50 (see FIG. 3) standing upward from an upper surface of the armrest 76.

The touch panel 50 faces the rear side (that is, the side of the operator seat 74). This enables the operator to operate the touch panel 50 by hand while sitting on the operator seat 74 and placing his or her arm on the armrest 76. Using the touch panel 50 allows input of vehicle speed control commands in the automated driving mode and input of device control commands to the devices (including blinkers, horns, headlights, air conditioner, wipers, etc.) provided in the automated vehicle 10. The details of a display screen of the touch panel 50 will be described later.

The armrest 76 is provided with a storage part 80. The storage part 80 stores an operating stick 21 (see FIG. 4) to input driving control instructions to the automated vehicle 10 during manual driving. The storage part 80 is covered with a lid 82, so that the operating stick 21 is not exposed to the vehicle cabin when the operating stick 21 is stored in the storage part 80.

On the upper surface of the armrest 76, an emergency stop button 84 is further provided as an input device for an emergency stop operation of the automated vehicle 10. The emergency stop button 84 is a mechanical button (physical button) for manual input of an emergency stop instruction. Here, the term "mechanical button" is used to refer to a physically tangible button instead of a button image that is displayed by a program on the touch panel 50 or the like. When the operator presses the emergency stop button 84, the emergency stop button 84 transmits an emergency stop signal converted into an electrical signal to the control unit 20 (see FIG. 4).

At a front left corner in the vehicle cabin, a display 86 (see FIG. 3) is provided to display information about the automated vehicle 10. For example, the display 86 displays an actual speed and a target speed of the automated vehicle 10. As the actual speed, a speed measured by a speed sensor 33

(see FIG. 5) is displayed on the display 86. As the target speed, a target speed that is set by a short-press operation (second operation) performed on a SLOWDOWN button 62 on the touch panel 50 is displayed. The setting of the target speed will be described later. In addition, the display 86 displays information such as ambient temperature and next stops.

Like the touch panel 50, the display 86 also faces toward the rear, and therefore the touch panel 50 and the display 86 appear to be side-by-side as viewed by the operator seated on the operator seat. This allows the operator to visually check the touch panel 50 and the display 86.

Automated Driving Mechanism

Figure 5:
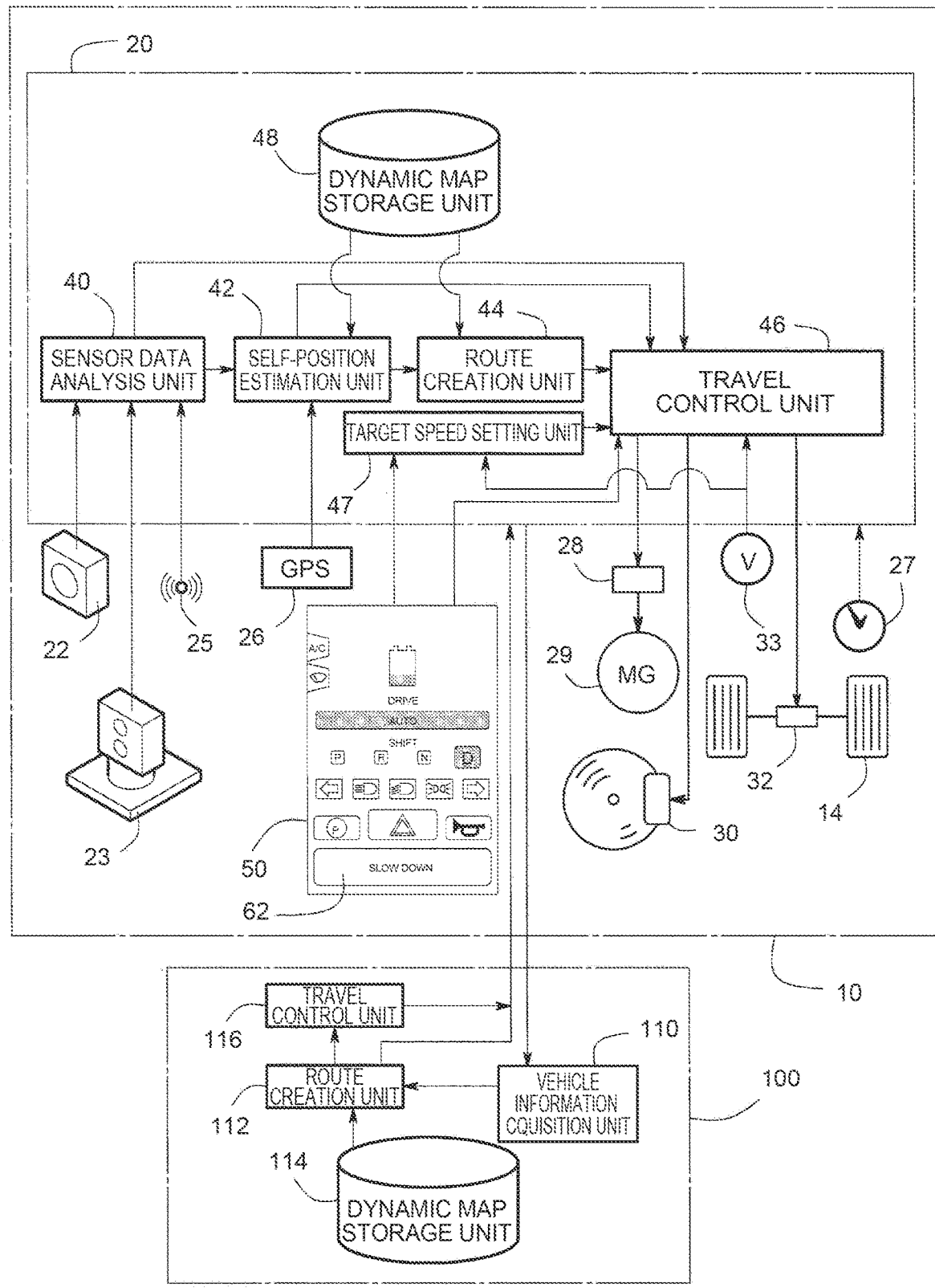
FIG. 5 illustrates functional blocks of the automated driving control system according to the embodiment.

FIG. 4 illustrates a hardware configuration of the automated driving control system according to the embodiment. FIG. 5 illustrates functional blocks of the automated driving control system mixed with the hardware. The automated driving control system includes the automated vehicles 10 and the management server 100. The automated vehicles 10 can communicate, i.e., exchange data, with the management server 100 via wireless communication.

Management Server Configuration

The management server 100 manages operation of the automated vehicles 10. The management server 100 is installed in, for example, a management company that manages the operation of the automated vehicles 10. The management server 100 is constituted of a computer, for example.

The management server 100 includes an input-output controller 100A to control data input and output. The management server 100 also includes a CPU 100B, a graphics processing unit (GPU) 100C, and a deep learning accelerator (DLA) 100D as arithmetic elements. The management server 100 further includes a ROM 100E, a RAM 100F, and a hard disk drive (HDD) 100G as storage units. A solid-state drive (SSD) may be provided in place of the hard disk drive 100G. These component members are connected to an internal bus 100J.

The management server 100 also includes an input unit 100H such as a keyboard, a mouse, or the like to input data as appropriate. In addition, the management server 100 includes a display unit 100I such as a display for browsing operation schedules and other information. The input unit 100H and the display unit 100I are connected to the internal bus 100J.

FIG. 5 illustrates functional blocks of the management server 100. The management server 100 includes a dynamic map storage unit 114 as the storage unit. The management server 100 also includes a vehicle information acquisition unit 110, a route creation unit 112, and a travel control unit 116 as functional units.

The vehicle information acquisition unit 110 receives vehicle information from each of the automated vehicles 10. The vehicle information includes a current position, vehicle speed, the number of occupants, battery SOC, and information on various devices acquired by in-vehicle sensors. The vehicle information also includes driving control commands issued by an operator riding on the automated vehicle, such as operations performed on the emergency stop button 84 (see FIG. 3) and the touch panel 50.

The dynamic map storage unit 114 stores dynamic map data on roads where the automated vehicle 10 is scheduled to travel and the periphery of the roads. The dynamic map is a three-dimensional map that stores, for example, the positions and shapes (three-dimensional shapes) of roads (roadways and sidewalks). The positions of lane markers drawn on the roads, crossroads, stop lines, etc. are also stored in the dynamic map. In addition, the positions and shapes (three-dimensional shape) of structures such as buildings and vehicle traffic lights are also stored in the dynamic map.

The route creation unit 112 creates routes for travel of the automated vehicles 10. For example, a travel route is created by selecting a route from roads including a branch. Dynamic map data corresponding to the created travel route is extracted from the dynamic map storage unit 114 and transmitted to the corresponding automated vehicle 10.

The travel control unit 116 transmits a driving control command to the corresponding automated vehicle 10 based on the travel route created by the route creation unit 112 and the vehicle information on the automated vehicle 10 acquired by the vehicle information acquisition unit. The driving control command includes a steering command and a speed command. In response to the driving control command, the travel control unit 46 of the automated vehicle 10 controls the rotary electric machine 29, a braking mechanism 30, a steering mechanism 32 and the like.

Configuration of Automated Vehicle

The automated vehicle 10 is mounted with mechanisms that enable automated driving. Referring to FIG. 4, the automated vehicle 10 includes the control unit 20, a camera 22, a LiDAR unit 23, a millimeter-wave radar 25, a GPS receiver 26, a clock device 27, an inverter 28, the braking mechanism 30, the steering mechanism 32, the speed sensor 33, and the touch panel 50.

The camera 22 images approximately the same field of view as the LiDAR unit 23. The camera 22 includes image sensors such as CMOS sensors and CCD sensors. The image imaged by the camera 22 (imaged image) is used for autonomous travel control as will be described later.

The LiDAR unit 23 is a sensor for autonomous driving. For example, the LiDAR unit 23 is a range sensor using infrared light. For example, the LiDAR unit 23 scans infrared laser beam in a horizontal direction and a vertical direction. This makes it possible to obtain three-dimensional point group data constituted of a three-dimensional array of range data about the environment around the automated vehicle 10. The camera 22 and the LiDAR unit 23 are provided as a sensor group unit and installed on four surfaces including a front surface, a rear surface, and side surfaces connecting the front surface and the rear surface of the automated vehicle 10, for example.

The millimeter-wave radar 25 is, for example, a proximity sensor that detects, for example, a distance between a curbstone, serving as a border between the roadway and the sidewalk, and the own vehicle when the automated vehicle 10 stops at a stop. The detection of distance makes it possible to perform so-called precise docking control for stopping the automated vehicle 10 in close proximity to the curbstone. The millimeter-wave radar 25 is provided on both side surfaces of the automated vehicle 10 and corners between the front surface and the side surfaces.

The GPS receiver 26 receives positioning signals from GPS satellites. For example, by receiving the positioning signals, the current position (latitude and longitude) of the automated vehicle 10 is obtained.

The control unit 20 may be, for example, an electronic control unit (ECU) of the automated vehicle 10. The control unit 20 is constituted of a computer. The control unit 20 illustrated in FIG. 4 is similar in configuration to the management server 100. The control unit 20 includes an input-output controller 20A, a CPU 20B, a GPU 20C, a DLA 20D, a ROM 20E, a RAM 20F, and a hard disk drive (HDD) 20G. A solid-state drive (SSD) may be provided in place of the hard disk drive 20G. These component members are connected to an internal bus 20J.

FIG. 5 illustrates the functional blocks of the control unit 20. The function blocks include a sensor data analysis unit 40, a self-position estimation unit 42, a route creation unit 44, a travel control unit 46, and a target speed setting unit 47. The control unit 20 also includes a dynamic map storage unit 48 as the storage unit.

As will be described later, the control unit 20 includes the travel control unit 46 capable of executing continuous deceleration control in response to a second operation (short-press), and the target speed setting unit 47 capable of performing speed setting change control in response to a first operation (long-press). Therefore, the control unit 20 is equivalent to the speed control device in the automated driving control system.

Like the dynamic map storage unit 114 of the management server 100, the dynamic map storage unit 48 stores dynamic map data on roads where the automated vehicle 10 is scheduled to travel and the periphery of the roads.

The automated vehicle 10 travels autonomously based on the data on the travel route created in the route creation unit 44. For autonomous driving, three-dimensional point group data on the environment around the automated vehicle 10 is acquired by the LiDAR unit 23. The camera 22 also images an image of the environment around the automated vehicle 10.

Objects in the image imaged by the camera 22 are analyzed by the sensor data analysis unit 40. For example, the objects in the imaged image are detected by known deep learning techniques such as Single Shot Multi Box Detector (SSD) and You Only Look Once (YOLO) using learning with a teacher, and the attributes (e.g., stops, passers, structures, etc.) of the detected objects are further detected.

The sensor data analysis unit 40 also acquires three-dimensional point group data (LiDAR data) from the LiDAR unit 23. By superimposing the image imaged by the camera 22 and the LiDAR data, it is possible to obtain what kinds of attribute (stops, passers, structures, etc.) the objects have and how far the objects are from the automated vehicle 10 (own vehicle).

The self-position estimation unit 42 also estimates the self-position in the dynamic map based on the self-position (latitude and longitude) received from the GPS receiver 26. The estimated self-position is transmitted to the route creation unit 44 and the management server 100.

The route creation unit 44 creates a route from the estimated self-position to a nearest target point. For example, a route from the self-position to a stop is created. When any obstacle is found on a straight route between the self-position and the stop based on the three-dimensional point group data from the LiDAR unit 23 and on the image imaged by the camera 22, a route to avoid the obstacle is created.

The travel control unit 46 performs travel control of the automated vehicle 10 based on the data obtained by superposing the imaged image and the LiDAR data, the self-position, and the created route obtained as described above. For example, the travel control unit 46 autonomously controls the travel speed of the automated vehicle 10 such that the travel speed of the automated vehicle 10 coincides with a target speed set by the target speed setting unit. For example, the travel control unit 46 controls the inverter 28 to maintain the speed of the automated vehicle 10 at the target speed. The travel control unit 46 also operates the wheels 14 through control of the steering mechanism 32 such as an actuator to control the automated vehicle 10 to advance along the determined path.

Figure 8:
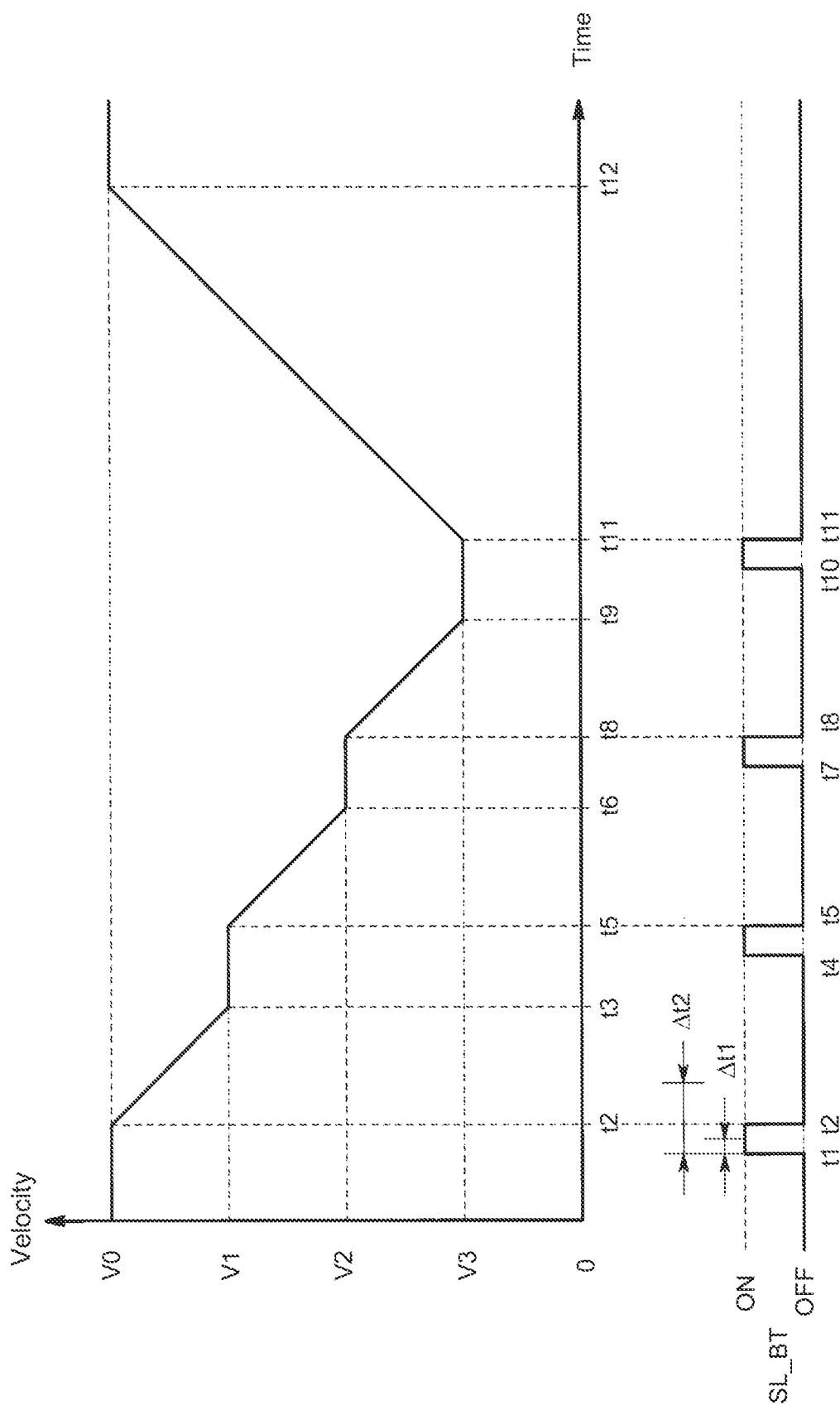
FIG. 8 is an illustration (1 of 2) of speed setting change control performed when a SLOWDOWN button is short-pressed.

The target speed setting unit 47 sets the target speed of the automated vehicle 10. As target speed candidates, a plurality of set speeds are stored in the target speed setting unit 47. For example, set speeds V0, V1, V2, V3 are set as shown in FIG. 8 described later. For example, the speed V0 may be set to 20 km/h, the speed V1 may be set to 16 km/h, the speed V2 may be set to 12 km/h, and the speed V3 may be set to 8 km/h.

As will be described later, whenever the SLOWDOWN button 62 on the touch panel 50 is short-pressed (second operation), the target speed is changed. For example, the target speed is changed in a descending order. Whenever the SLOWDOWN button 62 is short-pressed, the target speed setting is sequentially changed in order of set speed V0→set speed V1→set speed V2→set speed V3. When the target speed is set to the set speed V3 that is slowest set speed, and then the SLOWDOWN button 62 is short-pressed, the target speed is changed to the set speed V0 that is the fastest set speed. The speed setting change control will be described later.

When the automated driving control is remote automated driving control by the management server 100 instead of autonomous control by the automated vehicle 10, the imaged image and LiDAR data acquired by the sensor data analysis unit 40, the self-position information acquired by the self-position estimation unit 42, and target speed set by the target speed setting unit are sent to the management server 100. In response to this, the travel control unit 116 of the management server 100 sends a speed control command and a steering command to the travel control unit 46 of the automated vehicle 10.

Touch Panel

Figure 6:
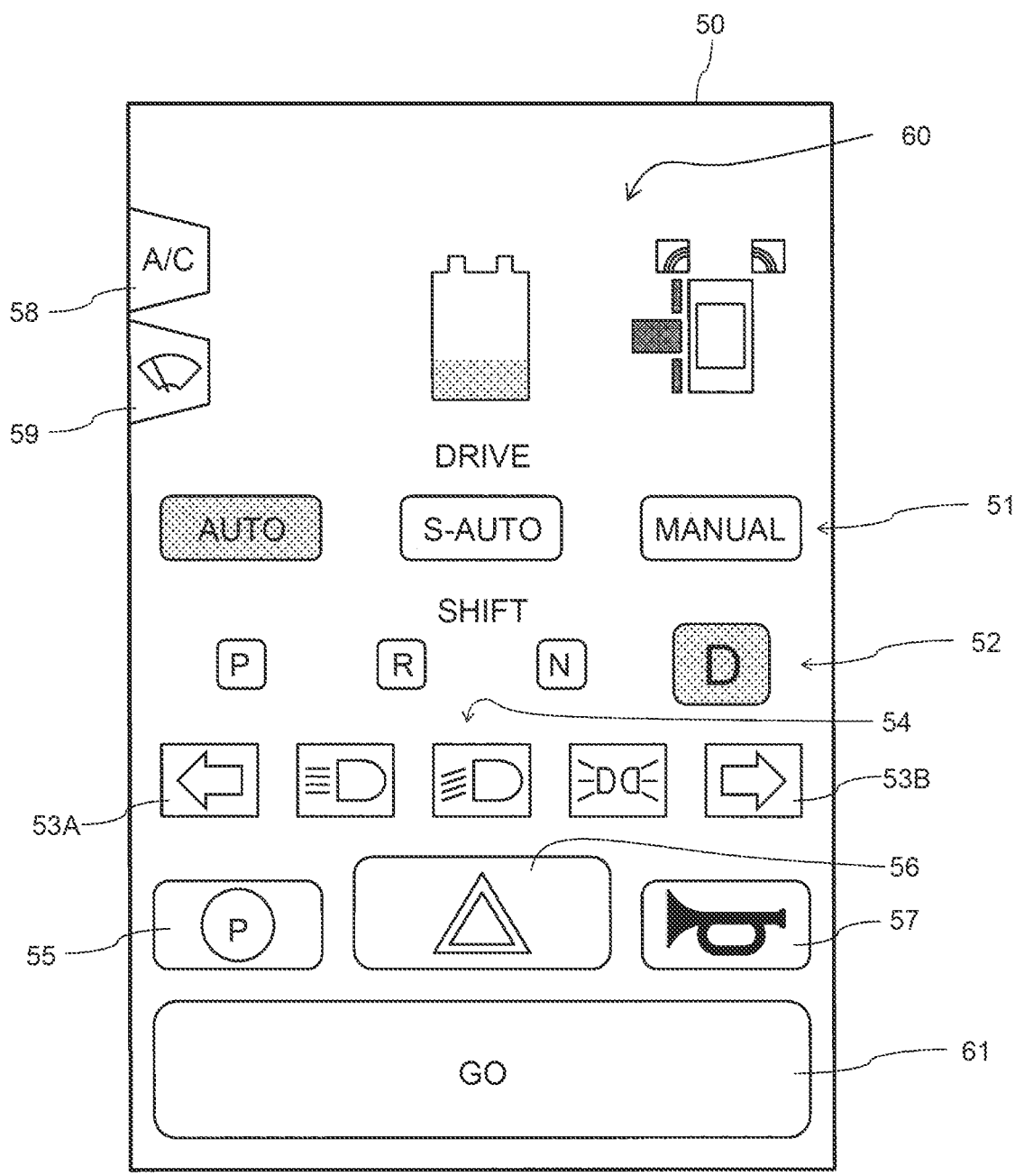
FIG. 6 shows a touch panel screen at the time of stopping.
Figure 7:
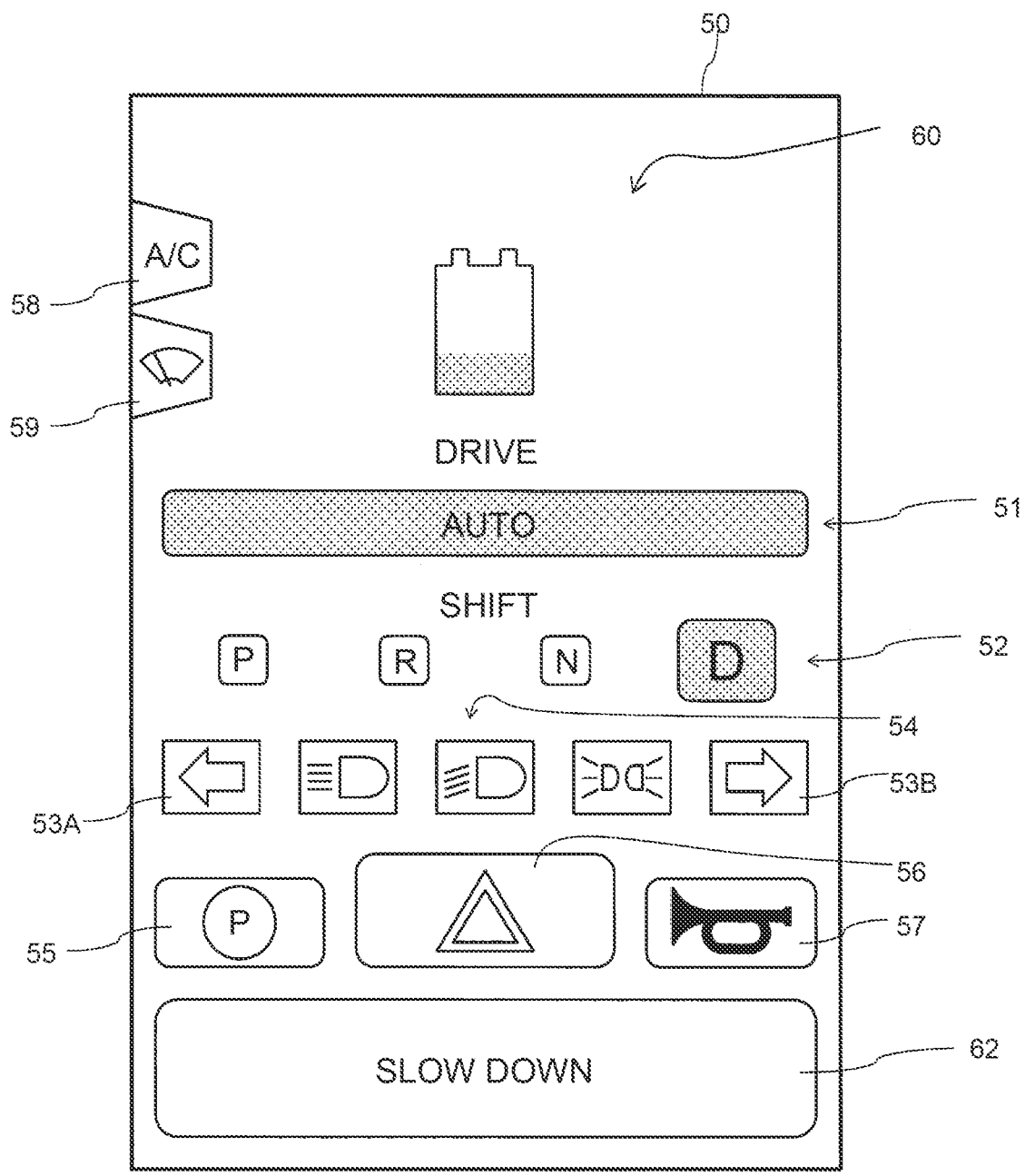
FIG. 7 shows a touch panel screen at the time of automated traveling.

FIGS. 6 and 7 illustrate screens displayed on the touch panel 50. The touch panel 50 functions as an operation input device that can accept a first operation (long-press) and a second operation (short-press) made by the operator. FIG. 6 shows the display screen when the automated vehicle 10 is in the automated driving mode and is stationary. FIG. 7 shows the display screen when the automated vehicle 10 is in the automated driving mode and the vehicle is traveling.

First, with reference to FIG. 6, the touch panel 50 displays following buttons (switches). That is, the touch panel 50 displays images of buttons including a driving mode button 51 to input a driving mode change instruction, a shift button 52 to input a shift change control instruction, blinker buttons 53A, 53B to control the blinkers, a light button 54 for controlling headlights and tail lights, a P brake button 55 to input an instruction to apply or release an electric parking brake, a hazard button 56 to turn on a hazard lamp, a horn button 57 to operate a horn, an air conditioning tab 58 to control the air conditioner, a wiper tab 59 to control the wipers, and a GO button 61 to instruct start.

The driving mode button 51 is set to be operational only when the automated vehicle 10 is stationary. In the example shown in FIG. 6, an "AUTO" button indicating the automated driving mode is selected. When a "MANUAL" button indicating the manual mode is selected, the shift button 52 is operational. In the automated driving mode, however, the shift button 52 is set to be unable to be operational to prevent operator-initiated shift change.

The GO button 61 is the button displayed on the touch panel 50 when the automated vehicle 10 is in the automated driving mode and is stationary. The GO button 61 is the button for inputting a start instruction to the automated vehicle 10. When the GO button 61 is operated, the automated vehicle 10 starts to travel in the automated driving mode under the control of the control unit 20.

With reference to FIG. 7, the touch panel 50 when the automated vehicle 10 is traveling in the automated driving mode will be described. When the automated vehicle 10 is traveling in the automated driving mode, the touch panel 50 displays the SLOWDOWN button 62 instead of the GO button 61. The SLOWDOWN button 62 is a button for inputting speed control instructions to the control unit 20 that is the speed control device of the automated vehicle 10.

The SLOWDOWN button 62 can accept a plurality of kinds of operation by the operator. The touch panel 50 including the SLOWDOWN button 62 functions as an input device that can accept such a plurality of kinds of operation.

The SLOWDOWN button 62 can accept a long-press operation as the first operation and a short-press operation as the second operation by distinguishing therebetween. Since a single button can receive a plurality of kinds of operation, it is possible to simplify the layout of the touch panel 50 (i.e., button placement on the user interface).

Referring to FIG. 5, when the SLOWDOWN button 62 on the touch panel 50 is pressed, the clock device 27 starts to measure time. For example, when the touch panel 50 is pressure sensitive, resistive layers are stacked on the touch panel 50, and a voltage is generated when the touch panel 50 is pressed with a finger. By measuring the voltage, the coordinates of a pressed point on the screen can be obtained. When the obtained coordinates are determined to be within a display area of the SLOWDOWN button image, the clock device 27 starts to measure time with the determination result as a trigger.

As illustrated in FIG. 8 described later, the target speed setting unit 47 determines that the SLOWDOWN button 62 is short-pressed (second operation) when the duration of time that the SLOWDOWN button 62 is continuously pressed is a prescribed threshold period $\Delta t1$ or more and a prescribed threshold period $\Delta t2$ or less. For example, the target speed setting unit 47 determines that the SLOWDOWN button 62 is short-pressed, when the duration of time that a voltage value generated in the touch panel 50 after the clock device 27 starts to measure time, i.e., the duration of time that the same coordinates are continuously pressed, is $\Delta t1$ or more and $\Delta t2$ or less.

The threshold period $\Delta t1$ is set to exclude so-called erroneous pressing. The threshold period $\Delta t1$ may be 0.1 seconds, for example. The threshold period $\Delta t2$ is set to distinguish between short-press and long-press. The threshold period $\Delta t2$ may be 1.0 seconds, for example. The clock device 27, which measures the pressing period of the SLOWDOWN button 62, may have a resolution of $\Delta t1$ or higher. For example, the clock device 27 uses 0.01 seconds as a smallest unit of measurement.

The target speed setting unit 47 determines that the SLOWDOWN button 62 is long-pressed (first operation) when the SLOWDOWN button 62 is continuously pressed over the threshold period $\Delta t2$. For example, the target speed setting unit 47 determines that the SLOWDOWN button 62 is long-pressed when the duration of time that the voltage value generated by the touch panel 50 is maintained at a constant value, that is, the duration of time that the same coordinates are pressed, exceeds $\Delta t2$.

Speed Control

FIGS. 8 to 11 illustrate speed control in the automated driving control system according to the present embodiment. The graphs in FIGS. 8 to 11 show examples of speed change of the automated vehicle 10 by speed control, with a horizontal axis representing time and a vertical axis representing speed (vehicle speed). The lower part of the graphs illustrates time charts regarding on-off operation of the SLOWDOWN button 62, the time charts being synchronized in time with the graphs.

In the time charts of the SLOWDOWN button 62, the button changes from OFF to ON when, for example, the voltage value, corresponding to the coordinates included in the display area of the SLOWDOWN button image on the image plane of the touch panel 50, is detected by a voltage sensor which is not illustrated. The ON state is maintained over the duration of time that the voltage value keeps the voltage value corresponding to the coordinates included in the display area of the SLOWDOWN button image.

FIGS. 8 to 11 show cases of interrupt control in which an operator riding on the automated vehicle 10 performs speed control during automated driving performed by the automated vehicle 10 or by the management server 100.

FIG. 8 shows an example of the speed setting change control caused by short-press (second operation). In the example of FIG. 8, the SLOWDOWN button 62 is intermittently short-pressed for total four times. In the speed setting change control, upon reception of the short-press operation (second operation), the target speed setting unit 47 selects one set speed out of a plurality of set speeds that are set in advance, and changes the target speed of the automated vehicle 10 to the selected set speed. Then, the travel control unit 46 controls the vehicle speed in order to reach and maintain the changed target speed.

In FIG. 8, the fastest set speed V0 is set as an initial value of the target speed. When the operator presses the SLOWDOWN button 62, the target speed setting unit 47 refers to the time measured by the clock device 27. When the pressing period is the threshold period $\Delta t1$ or more and the threshold period $\Delta t2$ or less, the target speed setting unit 47 determines that the short-press is performed. Upon detection of the short-press operation of the SLOWDOWN button 62, the target speed setting unit 47 changes the target speed from the fastest set speed V0 to the second fastest set speed V1.

From time t2 to time t3 after the change of the target speed, the travel control unit 46 executes deceleration control to reduce the vehicle speed to the new target speed V1. For example, the travel control unit 46 reduces drive electric power supplied to the rotary electric machine 29 through control of the inverter 28. Alternatively, the travel control unit 46 drives the braking mechanism 30 to brake the wheels 14. The deceleration control uses feedback control based on a difference between the target speed and the actual speed acquired by the speed sensor 33.

After the vehicle reaches the target speed V1 at time t3 or later, the SLOWDOWN button 62 is again short-pressed. As a result, the target speed is changed to the third fastest set speed V2. This causes the deceleration control to be executed from time t5 to time t6.

After the vehicle speed reaches the target speed V2 at time t6 or later, the SLOWDOWN button 62 is again short-pressed. As a result, the target speed is changed to the slowest set speed V3. This causes the deceleration control to be executed from time t8 to time t9.

After the vehicle reaches the slowest target speed V3 at time t9 or later, the SLOWDOWN button 62 is again short-pressed. As a result, the target speed is changed to the fastest set speed V0. This causes the travel control unit 46 to execute acceleration control from time t11 to time t12.

In this way, in the speed setting change control by the short-press operation (second operation), the short-press of the SLOWDOWN button 62 cyclically changes the target speed in order of V0→V1→V2→V3→V0.

Figure 9:
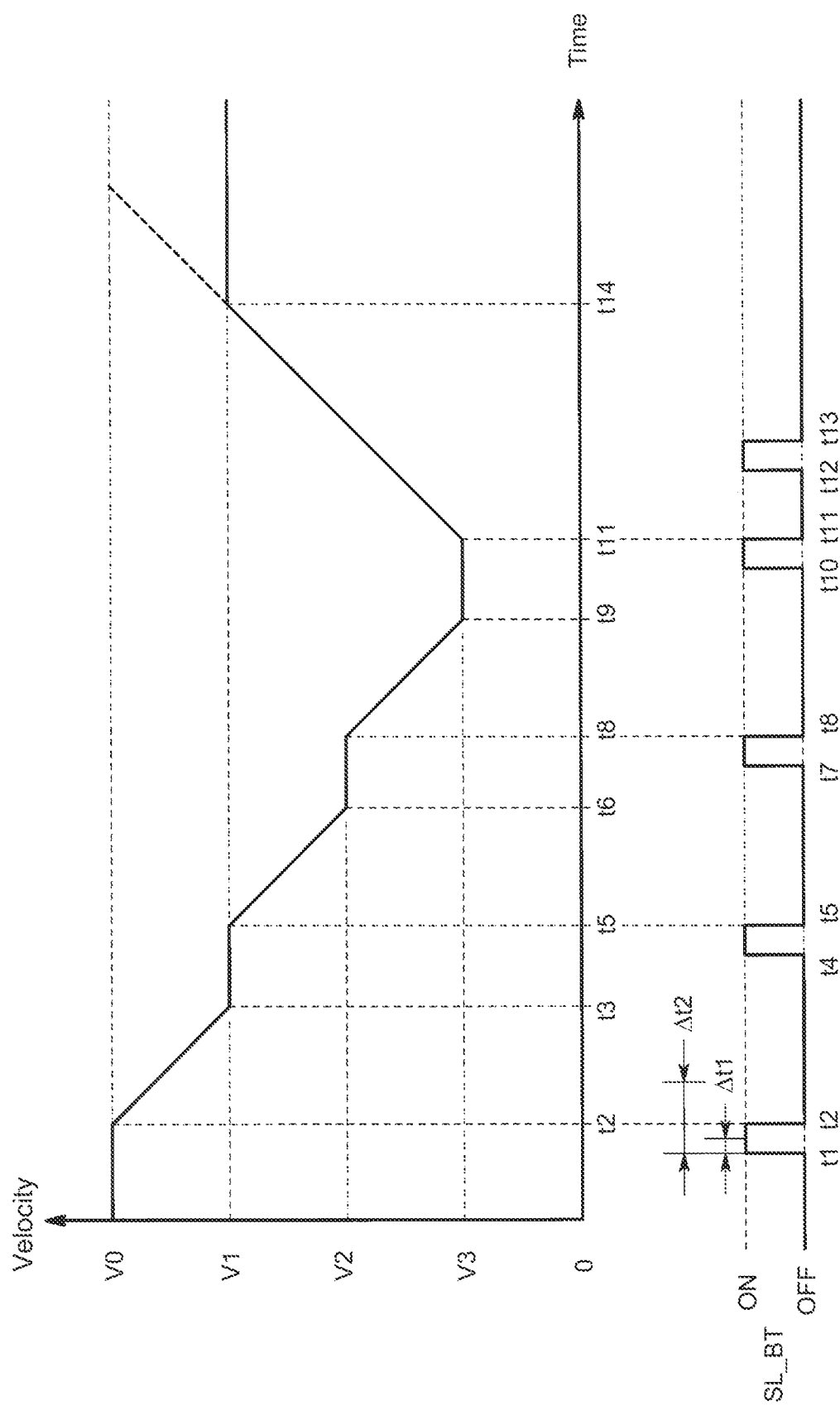
FIG. 9 is an illustration (2 of 2) of the speed setting change control performed when the SLOWDOWN button is short-pressed.

FIG. 9 shows an example in which the target speed is changed to the fastest set speed V0 at time t11, and the SLOWDOWN button 62 is additionally short-pressed while the travel control unit 46 performs acceleration control of the automated vehicle 10.

First, in a period from time t10 to time t11, the SLOWDOWN button 62 is short-pressed. As a result, the target speed is changed to the fastest set speed V0. At time t11 or later, the travel control unit 46 performs acceleration control, and in a period from time t12 to time t13 before the target speed reaches the fastest set speed V0, the SLOWDOWN button 62 is again short-pressed.

At this point, the target speed setting unit 47 changes the target speed from the fastest set speed V0 to the set speed V1 before the actual speed reaches the fastest set speed V0. After this change, once the actual speed (actual vehicle speed) reaches the target speed V1 at time t14, the travel control unit 46 maintains the vehicle speed at the speed V1.

Figure 10:
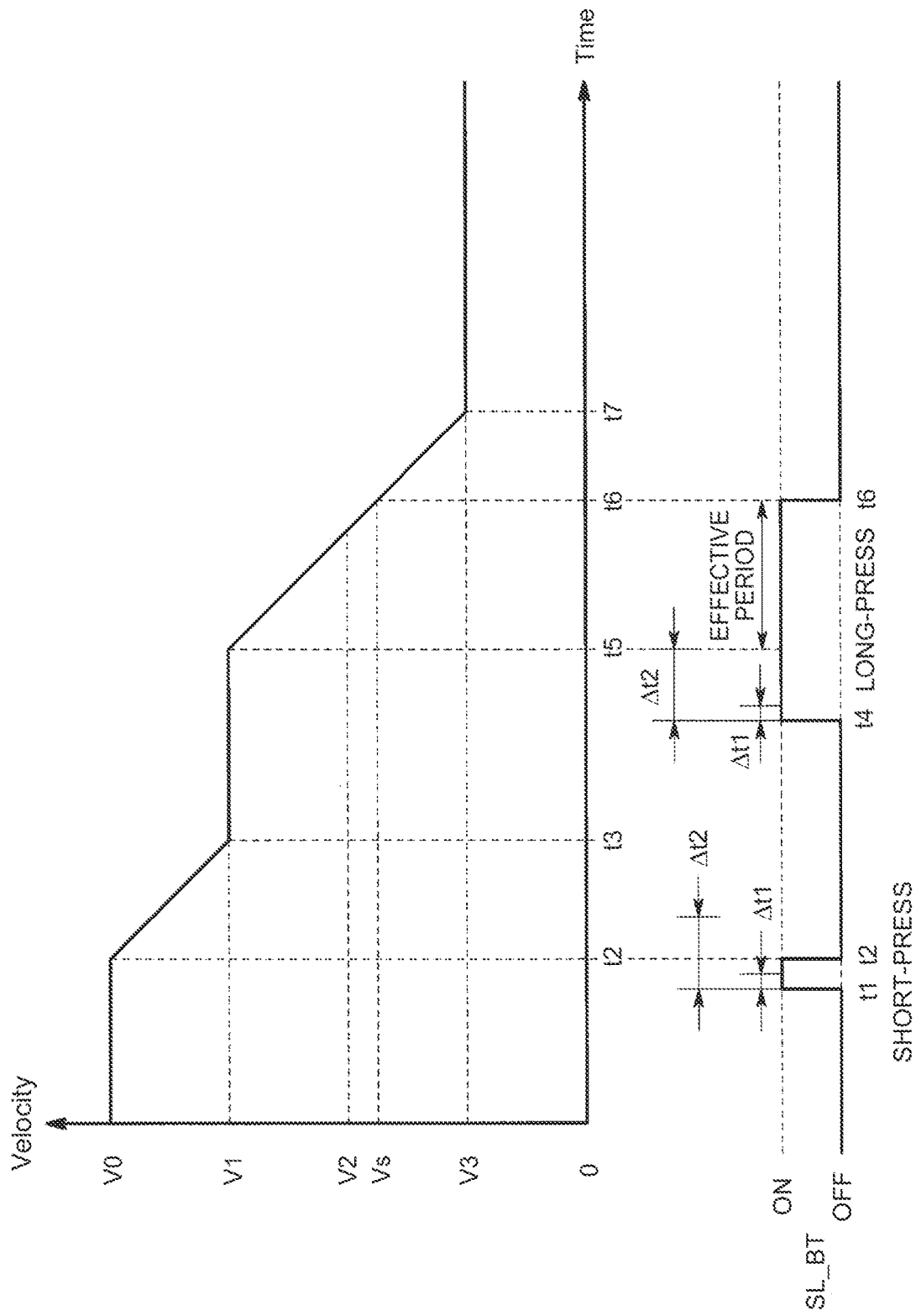
FIG. 10 is an illustration (1 of 2) of the continuous deceleration control performed when the SLOWDOWN button is long-pressed.

FIG. 10 shows an example of performing long-press operation (first operation) in addition to the short-press operation (second operation) on the SLOWDOWN button 62. When the SLOWDOWN button 62 is pressed at time t4, the target speed setting unit 47 refers to the pressing time measured by the clock device 27. When the duration of pressing the SLOWDOWN button 62 exceeds the threshold period of Δt2, the target speed setting unit 47 determines that the long-press operation (first operation) is effective and transmits a signal indicating that the long-press operation is executed to the travel control unit 46.

The travel control unit 46 monitors the long-pressed state of the SLOWDOWN button 62. For example, the travel control unit 46 monitors whether or not the voltage value corresponding to the coordinates on the SLOWDOWN button 62 on the touch panel 50 is maintained. The travel control unit 46 further executes continuous deceleration control for decelerating the automated vehicle over a period of time that the long-press operation is effective. For example, in the continuous deceleration control, the automated vehicle 10 is decelerated at a similar deceleration rate as in the speed setting change control.

Here, the period of time that the long-press operation (first operation) is effective is the operation period of the SLOWDOWN button 62 after it can be detected that the operation of the SLOWDOWN button 62 is the long-press operation (first operation). In the example in FIG. 10, the period extending from the time (time t5) when the pressing duration of the SLOWDOWN button 62 exceeds the threshold period Δt2 to the time (time t6) when the finger is detached from the SLOWDOWN button 62 is equivalent to the period that the long-press operation (first operation) is effective.

Figure 12:
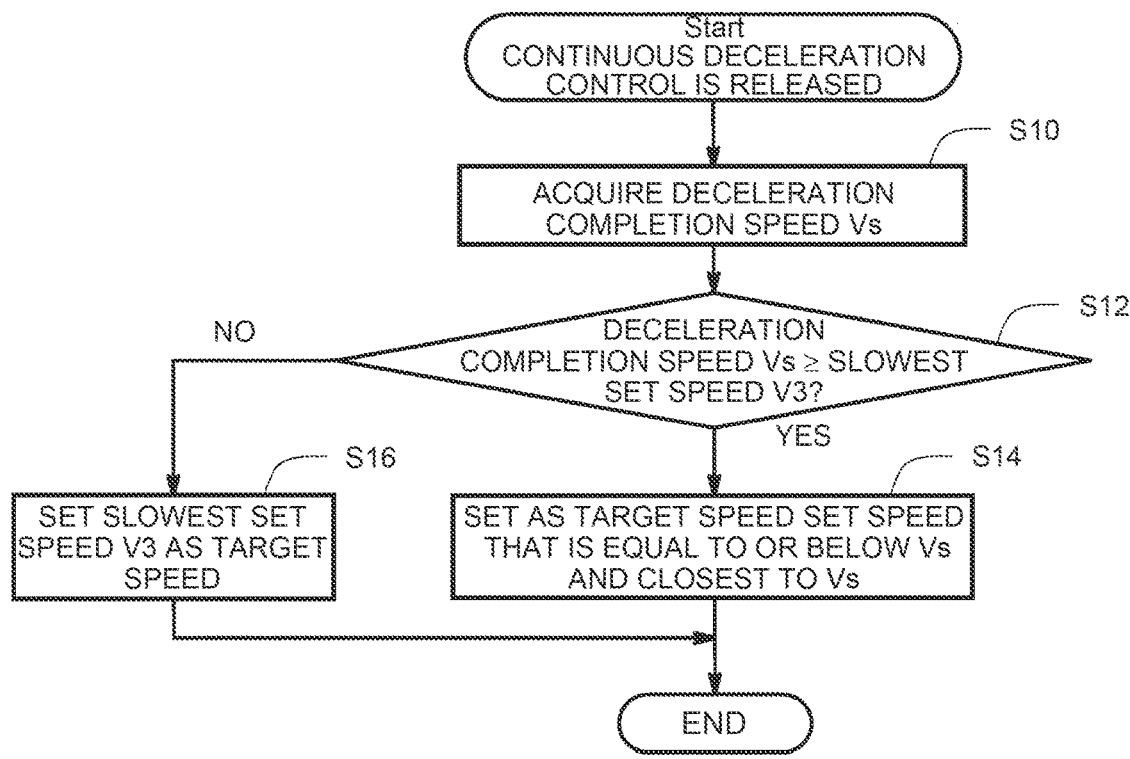
FIG. 12 is an explanatory view of target speed setting processing after the continuous deceleration control.

In the continuous deceleration control, the travel control unit 46 completes deceleration of the automated vehicle 10 immediately after pressing of the SLOWDOWN button 62 is released. After the continuous deceleration control is completed (time t6), the target speed setting unit 47 resets the target speed. FIG. 12 illustrates a target speed reset flow performed by the target speed setting unit 47.

At the start of the continuous deceleration control (time t5), the target speed is set to the set speed V1. When the continuous deceleration control is then performed and the continuous deceleration control is completed at speeds considerably lowered than the target speed V1, the automated vehicle 10 may possibly accelerate to the target speed V1. Therefore, in the automated driving control system according to the present embodiment, the target speed is reset to restrain the automated vehicle from accelerating against the intention of the operator after the continuous deceleration control is completed.

Referring to FIGS. 10 and 12, the target speed setting unit 47 acquires a deceleration completion speed Vs, which is the speed of the automated vehicle 10 at the completion of the continuous deceleration control (time t6), from the speed sensor 33 (see FIG. 5) (S10). The target speed setting unit 47 further determines whether or not the deceleration completion speed Vs is equal to or above the slowest set speed V3 (S12).

When the deceleration completion speed Vs is equal to or above the slowest set speed V3, the target speed setting unit 47 sets as a new target speed the set speed that is equal to or below the deceleration completion speed Vs and closest to the speed Vs (S14). In the example in FIG. 10, the slowest set speed V3 that is equal to or below the deceleration completion speed Vs at time t6 and closest to the speed Vs is set as the new target speed in place of the previous target speed V1.

In this way, when the target speed is reset, the value equal to or below the deceleration completion speed Vs is set as the target speed. This makes it possible to avoid acceleration immediately after the continuous deceleration control and to restrain reduction in ride comfort.

Meanwhile, when in step S12 the deceleration completion speed Vs is less than the slowest set speed V3, the target speed setting unit 47 sets the slowest set speed V3 as the new target speed (S16).

For example, in the example shown in FIG. 11, the deceleration completion speed Vs is below the slowest set speed V3 at time t6. In this case, the new target speed is set to the slowest set speed V3 that is the closest value to the deceleration completion speed Vs.

Figure 11:
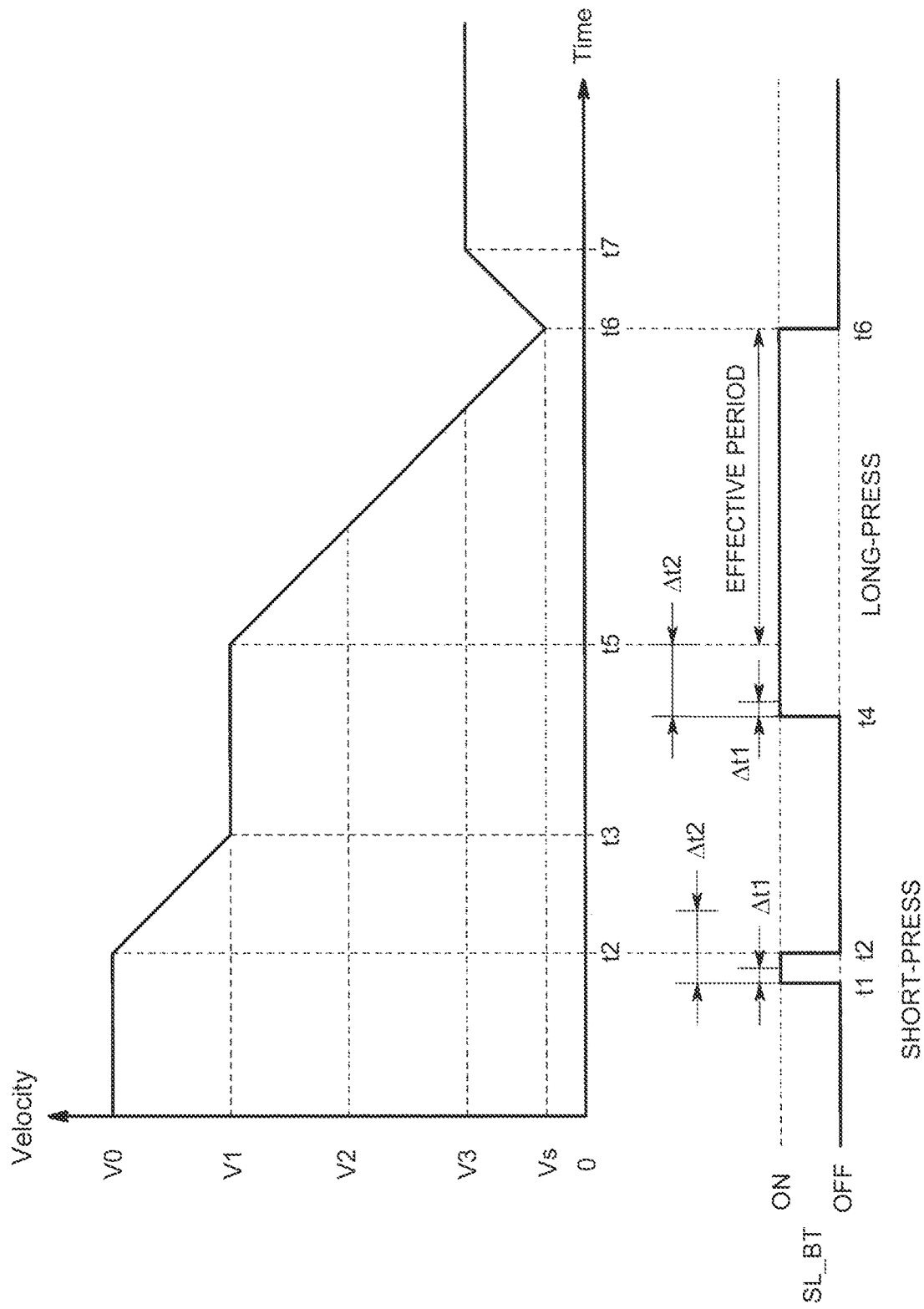
FIG. 11 is an illustration (2 of 2) of the continuous deceleration control performed when the SLOWDOWN button is long-pressed.

For example, in the example in FIG. 11, the target speed is set to the set speed V1 during the period from time t3 to time t6. At time t6 or later, when the automated vehicle 10 is accelerated from the deceleration completion speed Vs to only the slowest set speed V3, instead of accelerating to the speed V1, acceleration against the intension of the operator can be restrained.

Another Example of Speed Control

Figure 13:
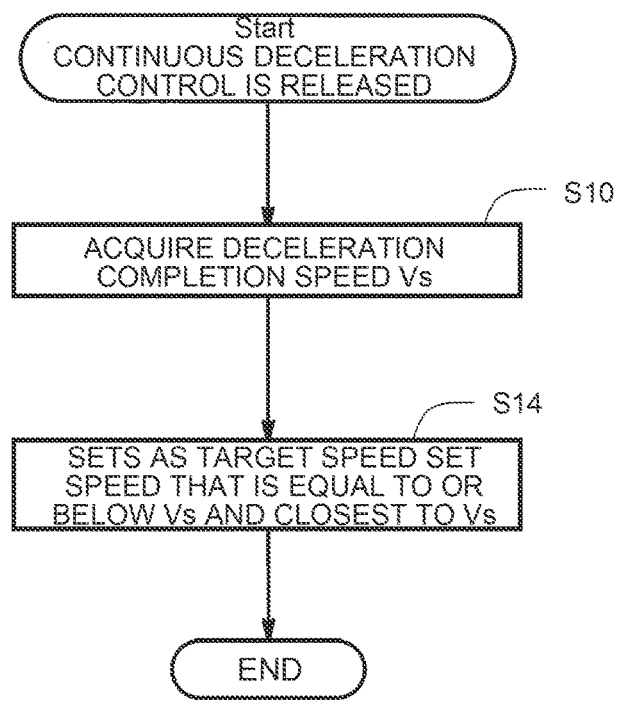
FIG. 13 shows another example of the target speed setting processing after the continuous deceleration control.

FIG. 13 shows another example of the target speed reset flow after the continuous deceleration control. In this example, the set speed that is equal to or below the deceleration completion speed Vs and closest to the speed Vs is set as the new target speed without performing comparison between the deceleration completion speed Vs and the slowest set speed V3.

This flowchart is effective when, for example, the slowest set speed V3 is set to 0 [km/h]. In other words, the deceleration completion speed Vs never becomes less than the slowest set speed V3 (=0), and the deceleration completion speed Vs is equal to or above the slowest set speed V3 in any case. Hence, distinction by comparison of the two speeds (S12) is omitted.

Another Example of Touch Panel

Figure 14:
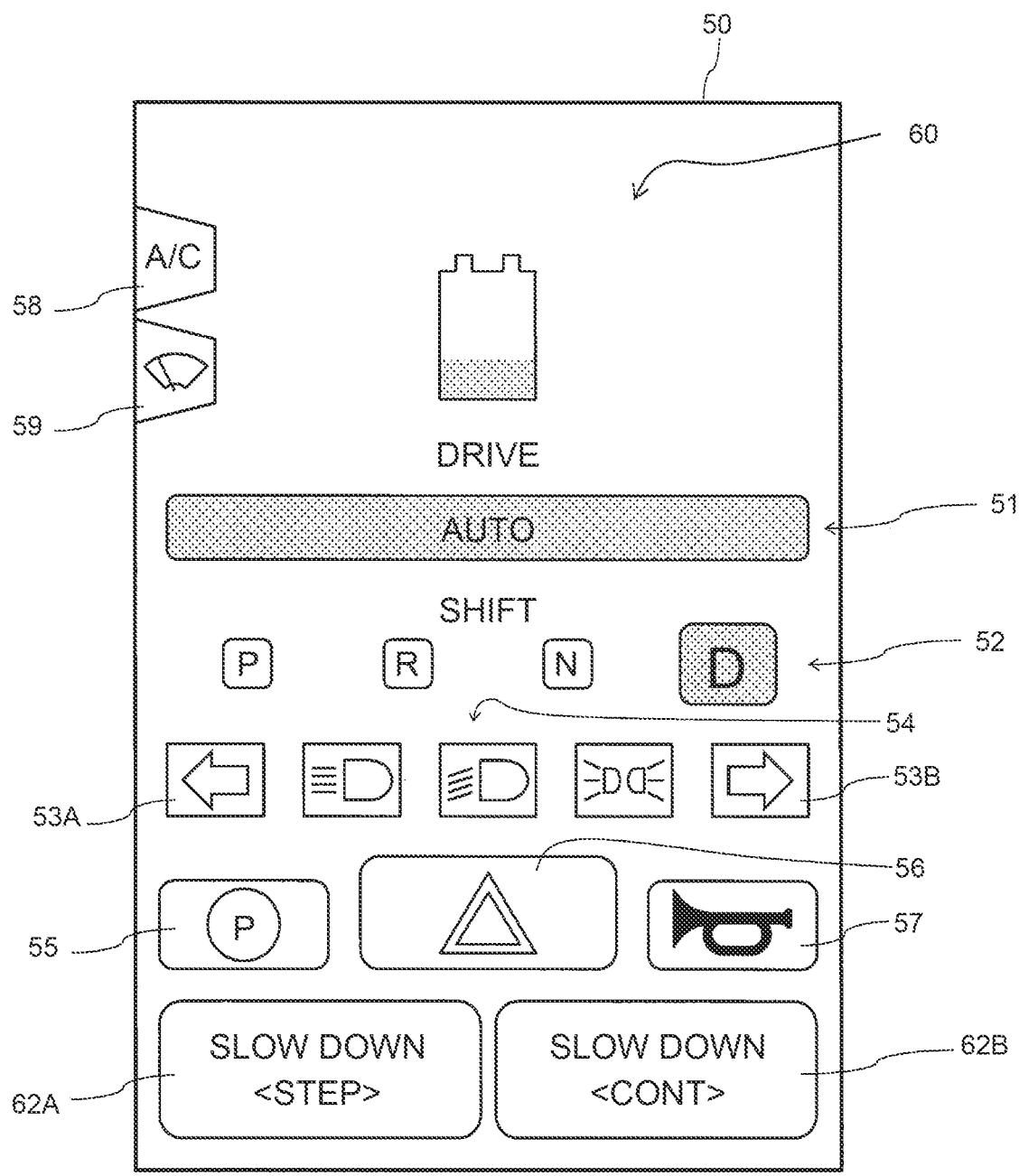
FIG. 14 shows an example of a touch panel provided with a button for speed setting change control and a button for continuous deceleration control in a separated manner.

FIG. 14 shows another example of the touch panel 50. The touch panel 50 includes a first SLOWDOWN button 62A dedicated to speed setting change control, and a second SLOWDOWN button 62B dedicated to continuous deceleration control.

FIG. 15 shows operation examples of the first SLOWDOWN button 62A and the second SLOWDOWN button 62B. The lower part of the drawing illustrates a time chart (SL_BT1) for on-off operation (short-press operation) with the first SLOWDOWN button 62A, and a time chart (SL_BT2) for on-off operation (long-press operation) with the second SLOWDOWN button 62B.

In this way, separately providing the button dedicated to speed setting change control and the button dedicated to the continuous deceleration control makes it possible to reduce accidental operation.

Since the button dedicated to speed setting change control and the button dedicated to the continuous deceleration control are independently provided, it is not necessary to distinguish between the speed setting change control and the continuous deceleration control by the long-press operation and the short-press operation. For example, as shown in FIG. 16, button operation in the continuous deceleration control may be set such that deceleration starts when the second SLOWDOWN button 62B is short-pressed once, and the deceleration is completed when the second SLOWDOWN button 62B is short-pressed again. Therefore, in this example, the period between two points of time that the short-press is detected corresponds to the long-press period. This can reduce the load of the operator who performs pressing operation when a deceleration period is long.

What is claimed is:

1. An automated driving control system, comprising:
    a button configured to accept a first operation and a second operation performed by an operator while a vehicle is traveling in an automated driving mode, the first operation is a long-press operation for continuously pressing the button for more than a prescribed threshold period; and
    a speed control device configured to control speed of the vehicle in accordance with the first operation and the second operation, wherein:
    the speed control device executes:
        continuous deceleration control for decelerating the vehicle over a period of time that the first operation is effective, and
        speed setting change control for selecting, upon reception of the second operation, one set speed out of a plurality of set speeds that are set in advance and changing a target speed of the vehicle to the selected set speed;
    when, upon completion of the continuous deceleration control, a deceleration completion speed, which is a speed at completion of the continuous deceleration control, is equal to or above a slowest set speed among the set speeds, the speed control device is configured to set as a new target speed the set speed that is equal to or below the deceleration completion speed and that is closest to the deceleration completion speed; and
    the speed control device completes the deceleration of the vehicle immediately after releasing the pressing of the button in the first operation.

2. The automated driving control system according to claim 1, wherein when the deceleration completion speed is less than the slowest set speed, the speed control device is configured to set the slowest set speed as the new target speed.

3. The automated driving control system according to claim 1, wherein:
    the second operation is a short-press operation for continuously pressing the button for the threshold period or less; and
    the speed control device is configured to change the target speed when the short-press operation on the button is detected.

* * * * *